United States Patent [19]
Harbers

[11] 3,912,293
[45] Oct. 14, 1975

[54] RETRACTABLE LOAD BOOSTER ASSEMBLY FOR LARGE CARGO TRUCKS

[75] Inventor: Henry C. Harbers, Pasadena, Calif.

[73] Assignee: Western Unit Corporation, City of Industry, Calif.

[22] Filed: May 1, 1974

[21] Appl. No.: 466,047

Related U.S. Application Data

[63] Continuation-in-part of Ser. No. 275,678, July 27, 1972, abandoned, which is a continuation-in-part of Ser. No. 155,434, June 22, 1971, abandoned.

[52] U.S. Cl. ......... 280/81 R; 180/24.02; 280/43.23; 280/150.5; 280/405 R
[51] Int. Cl.² ........................................... B60S 9/00
[58] Field of Search ..... 180/24.02; 280/81 R, 150.5, 280/43.23, 405 R, 405 A

[56] References Cited
UNITED STATES PATENTS

| | | | |
|---|---|---|---|
| 3,191,961 | 6/1965 | Brennan | 280/81 R |
| 3,246,884 | 4/1966 | Prichard et al. | 280/81 R |
| 3,282,601 | 11/1966 | Harbers | 280/405 X |
| 3,299,978 | 1/1967 | Sponsler | 180/24.02 X |
| 3,317,193 | 5/1967 | Buelow | 280/81 R |
| 3,479,049 | 11/1969 | Duecy | 280/81 R |
| 3,494,632 | 2/1970 | Bostrom | 180/24.02 X |
| 3,685,853 | 8/1972 | Goldsmith | 280/81 R |
| 3,718,346 | 2/1973 | Self | 280/150.5 |
| R25,617 | 7/1964 | Lyall | 180/24.02 X |

*Primary Examiner*—David Schonberg
*Assistant Examiner*—John P. Silverstrim
*Attorney, Agent, or Firm*—Whann & McManigal

[57] ABSTRACT

A retractable load booster assembly for use rearwardly of a large cargo truck to increase the load carrying capacity and including load sensing means for activating the air spring suspension after the assembly reaches and departs from its extended operating position. The power operating means for the assembly is energized by hydraulic fluid stored in accumulator means by an air driven pump supplied by air only after there is an adequate air supply to meet the needs of other air-operated auxiliaries. The control for the booster assembly includes foolproof provision for assuring its retraction before backing the truck and means for cushioning suddenly applied stresses without need for unloading the booster assembly or wasting air from the air bellows. Various auxiliaries governing the operation of the booster assembly are mounted on a strong frame securable as a unit to the midlength of the truck chassis to strengthen it and avoid the need for costly strengthening changes.

5 Claims, 7 Drawing Figures

RETRACTABLE LOAD BOOSTER ASSEMBLY FOR LARGE CARGO TRUCKS

This application is a continuation-in-part of my co-pending application for U.S. letters Pat. Ser. No. 275,768, filed July 27, 1972 (now abandoned), which in turn, is a continuation-in-part of my application for U.S. letters Pat. Ser. No. 155,434, filed June 22, 1971 (now abandoned).

BACKGROUND OF THE INVENTION

This invention relates to heavy duty cargo trucks, and more particularly to a new and improved retractable load booster assembly attachable to the rear of such trucks and operable to increase the truck capacity substantially within permissible highway axle loading limits.

Heavy cargo carrying equipment frequently has carrying capacity substantially in excess of permissible axle loadings for over-the-highway travel. Furthermore, it not infrequently happens that the load distribution on such equipment is poor with excess loading on certain axles and such low loading on the steerable front wheels as to interfere with the vehicle handling characteristics. Other problems include the fact that it is undesirable and disadvantageous to utilize a load sharing auxiliary except when actually needed. For example, its presence and use may be of crucial importance while transporting a heavy load over the highway whereas its use after discharging part or all of the load is undesirable from both operating and service life viewpoints.

Various proposals have been made heretofore in an effort to satisfy the foregoing and other needs but such efforts are subject to numerous shortcomings and disadvantages eliminated by the present invention. For example, devices heretofore provided are not readily and economically added to existing turck equipment and require costly and complicated alterations in the original equipment. They also interfere objectionably with the normal use of the truck equipment and particularly with the loading and unloading thereof. Some load sharing devices are hazardous in that they have pronounced tendencies to overturn the truck while making turns. It is of the utmost importance to make adequate provision for protecting the load sharing device while backing the truck and this feature has been either lacking, unreliable or quite inadequate. Another serious shortcoming of prior load distributors has been the need for heavy duty, high capacity power equipment for operating these devices, or in the alternative, they require an intolerably long operating period to extend and retract the load sharing device. Attempts have also been made to connect load distributing carriage units to the end of a chassis frame equipped with air bellows and control valve means operating to waste air and to add make-up air from a pressure-regulated supply with the objective of avoiding fluctuations in load distribution while traveling over rough roadways. However, such proposals are not only wasteful of air and highly inefficient but, more importantly, are inherently incapable of serving the desired objectives because unable to respond with the necessary speed.

SUMMARY OF THE INVENTION

The foregoing and numerous other inadequacies of prior load sharing assemblies are eliminated by the present invention utilizing a simple, ruggedly constructed, load booster utilizing a folding retractable carriage assembly equipped with automatically inflatable and deflatable air spring suspension means. The booster, in reality, comprises a compactly foldable and retractable additional axle assembly securable sufficiently rearwardly of a truck chassis that it is highly effective in increasing the carrying capacity of a vehicle without exceeding permissible axle loading limits set by the laws of local jurisdictions. The assembly is power operated between its extended and retracted positions by pressurized hydraulic fluid collected and stored between the actual operating cycles by a small capacity air-power pump driven by air supplied from the air reservoir customarily available on the truck to operate the vehicle brakes and various other auxiliaries. Owing to the very small air requirements for this motor, a small inexpensive fluid pump suffices and it is unnecessary to install a larger compressor or risk interference with the reliable operation of other truck air-powered auxiliaries. A check valve or like normally closed valve means in the pressurized fluid line supplying the fluid to the load booster assembly acts in cooperation with accumulator means of adequate capacity to avoid the need for fluid unloading means during severe and sudden stress loads on the load booster assembly, yet acts to cushion and absorb shock and temporary overloading forces thereon. The air driven pump operates so long as there is need for storing pressurized fluid and simply stalls when the storage need is satisfied. This eliminates the need for controls of any kind for the pump or its driving motor.

The spring suspension means for the load booster assembly is equipped with load leveling valve means connected to the pressurized air supply and operates not only to maintain the proper air pressure in the air springs necessary for its proper functioning and suitable to provide a soft ride for wide variations in the load being shared, but cooperates with the power operating means for the assembly to deflate the air springs as the assembly is being retracted and to automatically re-inflate the air springs when the assembly is again moved back to its extended operating position.

A four-way valve of the normally closed self-neutralizing type is connected in the fluid lines for the fluid motors operating the load sharing assembly. This valve is power operated under the manual control of the truck operator from his driving station and a second or fail-safe valve is controlled and operated by the truck transmission reversing lever. An interlocking control between the transmission control lever and extension control lever provides further fail-safe operation by deactivating the extension control lever and thereby positively preventing extension of the load booster assembly while the truck transmission is in reverse. A further feature of the control system is the use of a pressure holding valve which remains closed until the air pressure in the truck air reservoir reaches a predetermined pressure adequate for the safe operation of the truck brakes and other air operated auxiliaries.

The main frame and the draft linkage for the device are pivotally interconnected on a transverse horizontal hinging axis and the forward end of this draft linkage is similarly connected to the truck chassis. The power operating means is connected between the main frame and the truck chassis in such manner as to fold the device upwardly about its transverse pivot axis thereby holding the carriage wheels elevated and against the rear end of the truck. In this position they offer a minimum of interference with the rear end of the truck and with loading and unloading operations frequently conducted thereover.

Another feature is the provision of a unitary power pack assembly supporting various auxiliaries and constructed with a strong frame. This unit is easily secured crosswise of the truck chassis intermediate its front and rear wheels where it reinforces the chassis without need for structural changes in the chassis. A limited number of hose connections extend between the power assembly and the booster assembly.

Another object of the invention is the provision of a compactly foldable load booster assembly for heavy duty vehicles operable when extended to increase the load carrying capability of the vehicle without adversely affecting the vehicle stability on the road.

Accordingly it is a primary object of the present invention to provide an improved greatly simplified light but rugged load booster device for use on heavy cargo trucks to redistribute the load between the axles thereof to increase the load handling capability of the truck.

Another object of the invention is the provision of hydraulically powered means for extending and retracting a load booster assembly equipped with automatic means for inflating and deflating the air spring suspension means thereof as an incident to the extension and retraction of the assembly.

Another object of the invention is the provision of a load booster device for a cargo truck having power operated extension and retraction means therefor automatically responsive to the conditioning of the truck for backing to retract the load booster assembly.

Another object of the invention is the provision of a heavy cargo truck with a foldable load booster assembly equipped with a hydraulically operated power means to extend and retract the same and having a hydraulic pump driven by pressurized air supplied from the truck compressor and continuously in communication with the pressurized air supply so long as there is adequate reserve air to supply the needs of the truck auxiliaries.

Another object of the invention is the provision of a load booster assembly for trucks utilizing hydraulic fluid accumulators to accumulate and store pressurized fluid between operating cycles of the assembly and enabling these operating cycles to be performed quickly without need for high capacity hydraulic pump means.

Another object of the invention is the provision of a folding load booster device for cargo trucks having manually operated means for extending the assembly and independent manual control means for retracting the assembly utilizing as a part thereof the truck reverse control lever. Interlocking fail-safe means interconnecting these two manual controls safeguards against any possibility of the retraction control being nullified by the activated condition of the extension control.

Another object of the invention is the provision of a load booster device utilizing hydraulic motor means to hold the device extended by a normally closed pressurized fluid line and including therein accumulator means of adequate capacity to cushion and protect the assembly during temporary overload and shock conditions and without need for unloading any portion of the trapped hydraulic fluid.

These and other more specific objects will appear upon reading the following specification and claims and upon considering in connection therewith the attached drawings to which they relate.

DETAILED DESCRIPTION OF THE EMBODIMENTS

Figure 1:
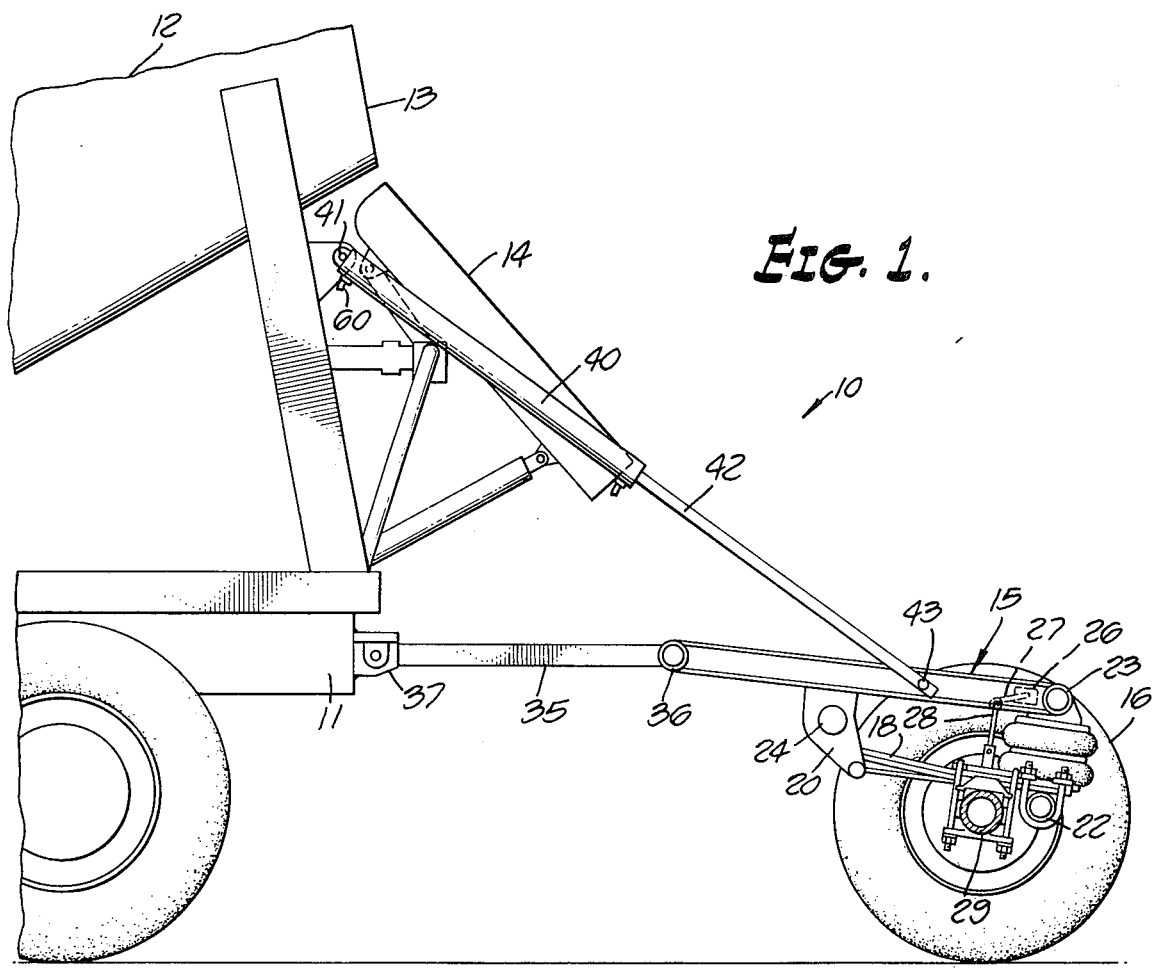
FIG. 1 is a fragmentary elevational view of a typical illustrative embodiment of the invention in its normal extended operating position at the rear end of a transit mixer truck.
Figure 2:
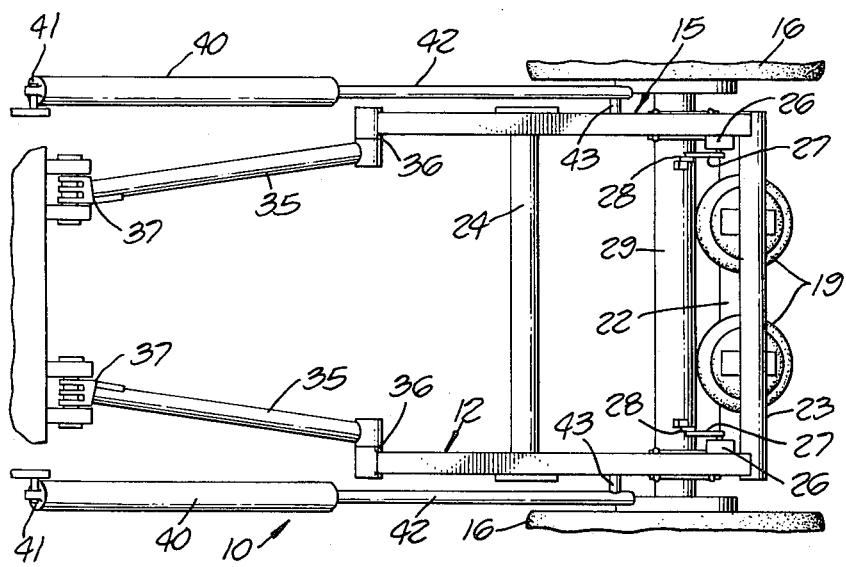
FIG. 2 is a fragmentary top plan view of the load booster assembly.
Figure 3:
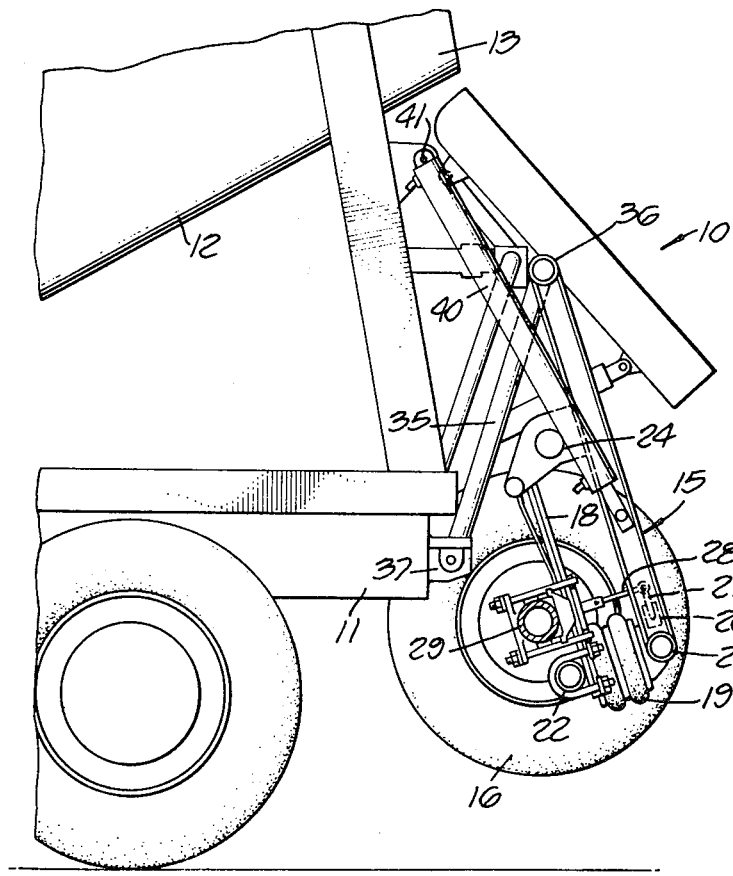
FIG. 3 is a fragmentary elevational view of the load booster device held in its fully folded retracted position with parts thereof in cross section.

Referring initially more particularly to FIGS. 1, 2 and 3, there is shown an illustrative embodiment of the invention load booster assembly, designated generally 10, connected to the rear end of chassis 11 of a vehicle such, for example, as a typical truck such as a transit mix truck. The chassis and superstructure of the truck or vehicle is referred to in general as the vehicle structure. Mounted on the chassis is a power-driven mixer drum 12 supported for rotation about an upwardly rearwardly inclined axis in accordance with customary practice. The drum outlet 13 overlies the rear end of the truck and a mix distributing chute 14 pivotally supported in known manner for directing the mix to various discharge points about the rear end of the truck. These features form no part of the present invention and need not be further described.

Load booster assembly 10 has a frame means including a main frame 15 supported above wheel means such as a carriage 16 by resilient suspension means comprising a leaf spring 18 and air springs 19. The forward end of spring 18 is connected to main frame 15 via hangers 20 and their rear ends are interconnected by a transverse tube 22. The lower ends of the two air bellows 19, 19 are clamped to tube 22 whereas their upper ends are clamped to tube 23 forming a part of main frame 15. Hanger brackets 20 are likewise preferably interconnected by a rigid tube 24.

The spring suspension assembly includes selfleveling valves 26 secured to frame 15 and of any well known construction such as is disclosed in my U.S. Pat. Nos. 3,063,703 and 3,063,732. An operating lever 27 for these valves has its free end connected by a link 28 to the underlying portion of carriage axle 29. Valve 26 is supplied with pressurized air via conduit 30 (FIG. 4), and its outlet is connected to the associated air bellows 19 by conduit 31. The air bellows and its associated parts constitutes a means operable after the frame means has been moved into its extended position for causing relative movement between the wheel means and the frame whereby at least a portion of the weight of the vehicle is supported by the wheel means. When air is supplied to the bellows, the extended end of the main frame is moved or jacked upwardly so that a portion of the weight of the vehicle and its load is supported by the load booster assembly. A conduit or port 32 vents the valve to the atmosphere in a manner well known to those familiar with the operation of such valves. Valve 26 operates upon an increase in the load applied to frame 12 to admit more air to bellows 19. If the loading is reduced then lever 27 pivots in the opposite direction to vent air to the atmosphere from the bellows via port 32. Likewise if the bellows is not inflated to its designated load carrying position, the valve functions to supply additional air while closing venting port 32. Valves 26 preferably have a time delay constant, such as 10 seconds, to avoid wasting air to the atmosphere unless there has been an actual decrease in loading with the result that no change in the air charge normally occurs in passing over bumps and depressions.

Main frame 12 constitutes a part of a foldable main frame and is connected to the rear of the truck through a pair of pivoting links or inner frame parts 35, 35, the rear ends of these links being journaled to the forward end of outer frame part 15 via knuckles 36. Likewise, the forward ends of draft links or inner frame parts 35 are pivoted to the truck chassis by rubber bushing assemblies 37.

Further stabilizing assembly 10 and providing means for extending and retracting it, there is provided a pair of struts comprising strut means and including strut shortening and lengthening means in the form of linear motors or double action hydraulic cylinders 40, 40 having their upper ends connected to the truck chassis at points above the pivotal connection 37 by pivot pins 41. The piston rods 42 of these motors have their lower ends pivoted to the outer frame part of the main frame at 43. The elements described in this paragraph constitute a means for moving said foldable main frame from its folded position adjacent to the rear part of the vehicle to an unfolded position in which the foldable main frame extends rearwardly from the vehicle in a generally horizontal direction without placing thereon any vehicle or load weight, and constitutes strut means for preventing said main frame from moving upward.

Figure 4:
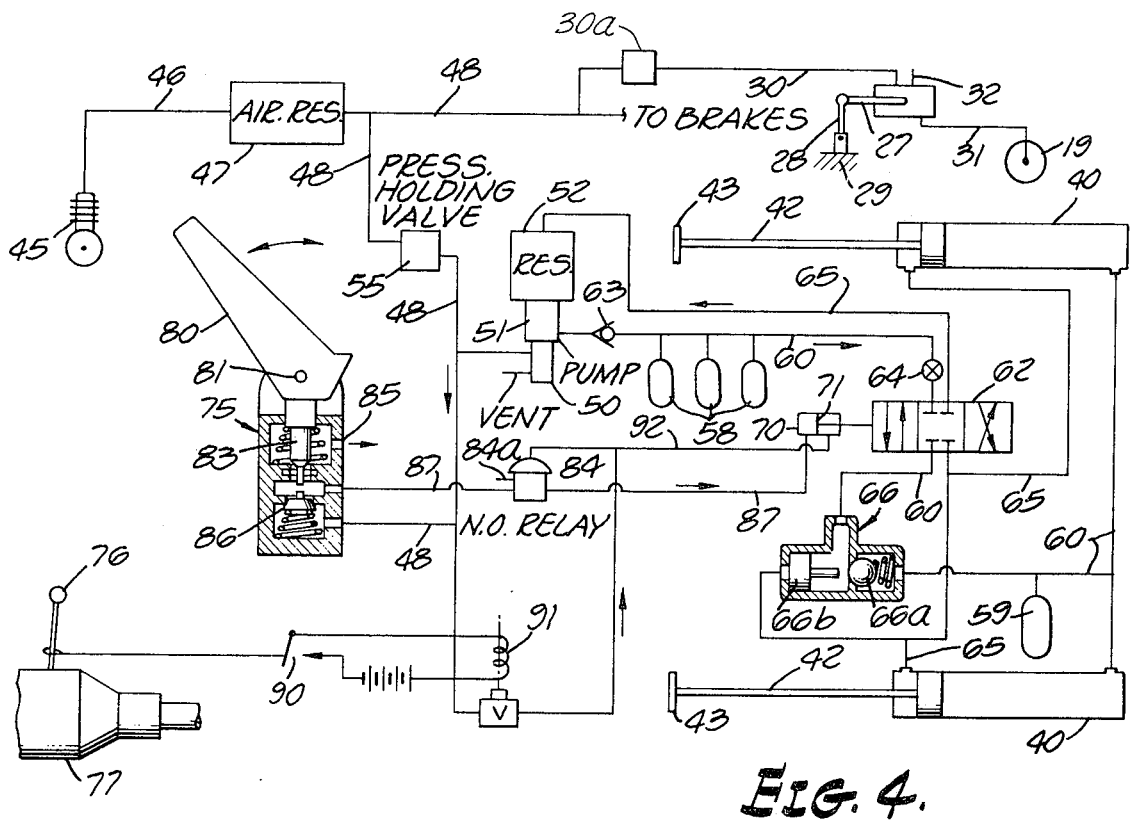
FIG. 4 is a diagrammatic view of the control system and associated parts of the truck.

Referring now to FIG. 4, there is shown the significant portions of the operating and control components for assembly 10. It will be understood that the truck engine, not shown, drives an air compressor 45 discharging via conduit 46 into an air reservoir 47. An air distributing line 48 serves various air operated auxiliaries including the usual air operated brakes, the air suspension springs usually employed in the truck chassis, and other auxiliaries well known to those skilled in this art. The line 30 which supplies air to the self-leveling valves 26 is connected to the air pressure line 48 and includes a pressure responsive valve which remains closed until a predetermined air pressure is built up in the air reservoir 47. In applicant's present design, the pressure at which valve 30a opens is 85 psi, but obviously can be changed to another pressure value. Air distributing conduit 48 also services a small air motor 50 driving a hydraulic pump 51 having its inlet connected to a fluid reservoir 52. Mounted in line 48 is a pressure holding valve of well known construction having its spring biased diaphragm effective to hold the valve closed until the air pressure in reservoir 47 reaches a value safely adequate to operate the vehicle brakes and other essential auxiliaries with a safe margin. This safeguard enables the operator to move the truck with safety promptly after starting the motor and prevents using a portion of the possibly limited initial air supply to drive motor 50.

It will be understood that a very small motor 50 and pump 51 can be utilized because of the presence of one or more accumulators 58, 59. These are connected to the pressurized outlet line 60 leading to the upper ends of linear motors 40 via a normally closed self-centering four-way valve 62 and a pilot operated check valve 66 of conventional construction such as model PC-50 made by Brand Hydraulics, Omaha, Nebraska. Valve 62 is supplemented by the check valve 63 and may also include a manually closable valve 64. The lower ends of these motors are connected via return conduit 65 and valve 62 into reservoir 52. Valve 66 has a check valve 66a spring pressed to the left as viewed in FIG. 4 against its seat A pressure responsive piston 66b has its stem positioned to unseat the pilot valve and hold it unseated when pressurized fluid is supplied to the left end of cylinders 40 to retract carriage wheels 16.

Four-way valve 62 is operated by an air cylinder 70 having its piston 71 connected to the piston for the four-way valve. This cylinder is controlled either by a manual control valve 75 in the truck cab or by the control lever 76 of the truck transmission 77. Operating lever 80 of valve 75 is pivoted to the valve body at 81 and normally occupies the position illustrated wherein valve 83 is open to vent the left hand end of air cylinder 70 to the atmosphere through the normally open relay valve 84 and venting port 85 of valve 75. When the operating lever is depressed, venting valve 83 closes and main valve 86 opens to supply pressurized air from supply line 48 past valve 86, through conduit 87 and the normally open relay valve 84, into the left hand end of cylinder 70, thereby shifting the four-way valve piston to the right.

Since it is highly undesirable and severe damage to assembly 10 can result if the truck is backed while assembly 10 is extended, there is provided a fail-safe, foolproof method of assuring that the truck operator cannot back the truck, either deliberately or by inadvertence. Such safe-guard is achieved by connecting the transmission reverse control 76 to an electric switch 90 connected in circuit with a normally closed solenoid valve 91 located in the pressurized air conduit 48. When switch 90 is closed by placing transmission control lever 76 in reverse, solenoid 91 is energized to its open position to supply air to conduit 92 leading to the right hand end of cylinder 70 as well as to the control chamber of relay valve 84. Air admitted to the relay valve control chamber closes this valve cutting off and closing conduit 87. When this conduit is closed by the relay valve it is impossible to supply pressurized air into the left hand end of cylinder 70 by opening the manual valve 86. Moreover, any air present between valve 84 and cylinder 70 is vented to the atmosphere via vent port 84a of the relay valve.

Figure 5:
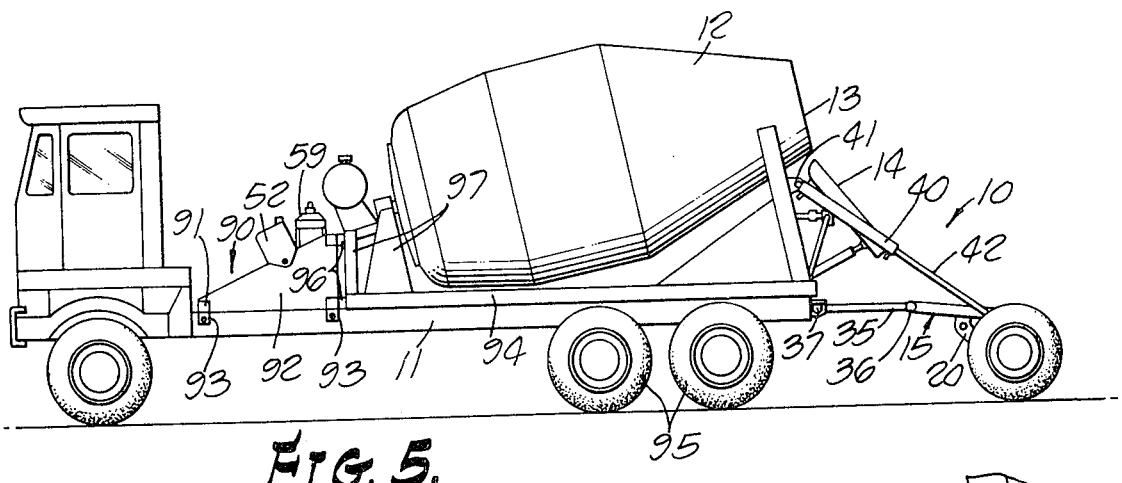
FIG. 5 is a side view of the booster assembly in use on a truck and showing the power pack unit therefor serving to strengthen the frame of the truck chassis.
Figure 6:
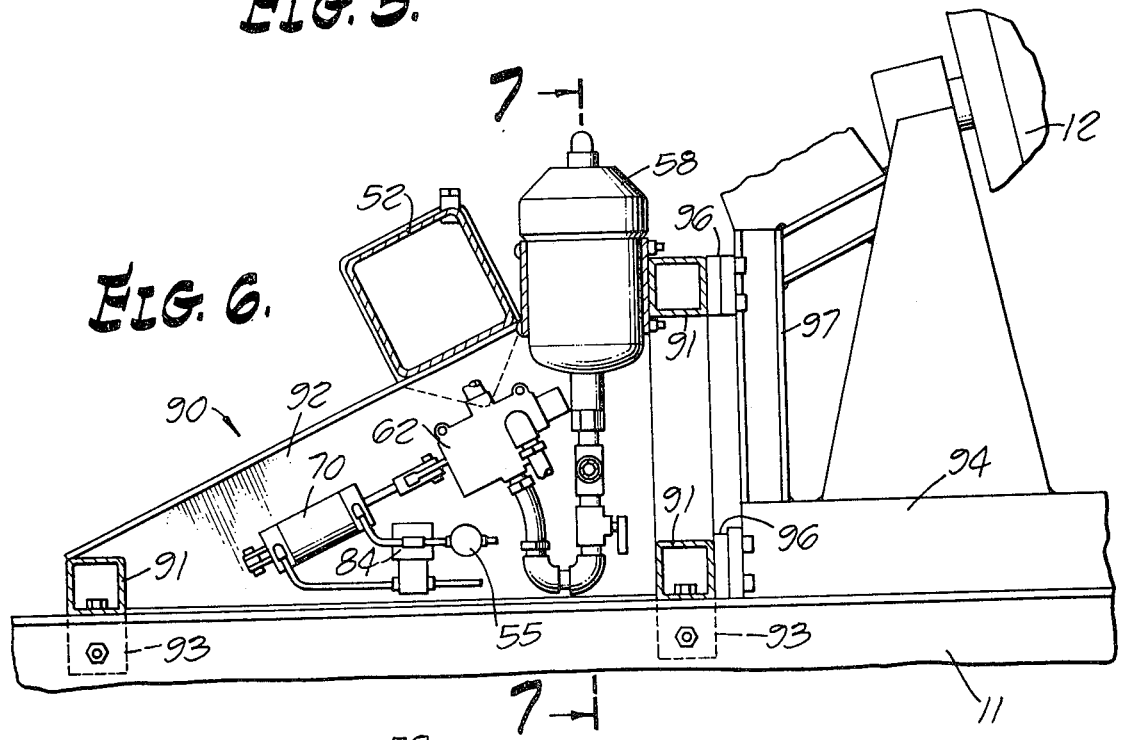
FIG. 6 is a fragmentary view on an enlarged scale of the power pack unit with portions broken away.
Figure 7:
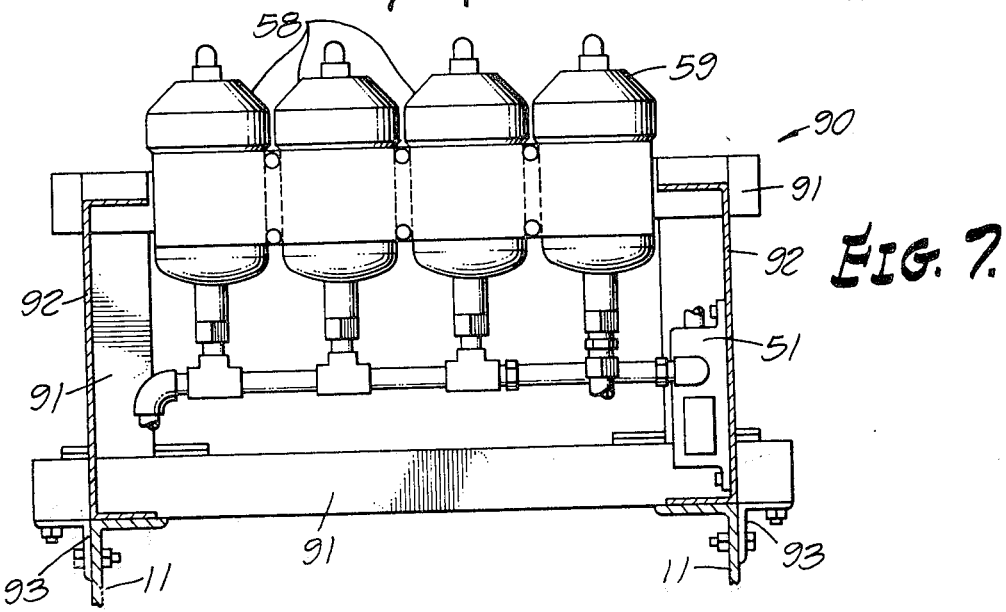
FIG. 7 is a vertical sectional view taken along line 7—7 on FIG. 6.

Referring now to FIGS. 5–7, there is shown a suitable power pack unit 90 supporting principal auxiliaries for the booster and the manner in which the rugged frame of unit 90 can be utilized to advantage in strengthening the frame of truck chassis 11 to carry a substantially greater load than its original design load. Unit 90 as here shown by way of example has a main frame 91 of generally triangular shape as viewed from one side and formed of heavy structural steel members welded together. The frame includes heavy gauge end panels 92 formed with inturned flanges along their upper and lower edges. Many of the booster auxiliaries described above in connection with FIG. 4 are mounted on the power pack and the numerous conduits and other connections are confined to the protection of the unit frame where they are conveniently accessible for inspection and servicing. The only connections between unit 90 and booster 10 are the hose connections to cylinders 40 and to air springs 19.

Power pack 90 is preferably made to span the width of the frame of chassis 11 to which it is bolted or welded by means such as brackets 93. Typically, a load, such as mixer 12, has its own supporting base 94 which is secured to the chassis frame in an area overlying the rear truck wheels 95. In consequence, the portion of the chassis frame between the truck cab and the forward end of base 94 is in need of strengthening in view of the substantially increased load the truck can carry by the aid of booster 10. This strengthening is readily and simply provided by mounting power pack 90 in the area in need of strengthening. The vertical sidewall faces rearward and suitable adapter members 96, 96 (FIGS. 5, 6) are secured in place between the base and the top of frame members 91 and the adjacent portions of strut members 97 of the support for mixer drum 12, or the like portions of the load support of the truck.

OPERATION

The operation of assembly 10 will be readily apparent from the foregoing detailed description. Let it be assumed that the truck modified as described above to increase its pay load by several ton, has been fully loaded and that the truck or an auxiliary engine has been rotating drum 12. Before moving the truck onto the highway, it is important that assembly 10 be moved to its extended position to assume a part of the truck load and possibly to redistribute a portion of the load otherwise carried on the rear truck axles onto the front wheel axle. In this connection it will be understood that in some installations of the invention booster the loading on the front wheels may actually be decreased while in others it is increased. In general, it is found that front wheel loading varies only by a few hundred pounds and in either direction from the loading prior to installation of assembly 10. For this reason the truck handling characteristics remain much as they were under the original full design load conditions.

Since the engine has been operating, compressor 45 will have brought the air pressure in reservoir 47 up to a level well in excess of that required to operate the truck brakes and any other auxiliaries. Under these conditions, pressure holding valve 55 will be open and motor 50 will have been operating pump 51 to store fluid in accumulators 58 to a suitable value such as 600 psi. Accordingly, these accumulators are fully charged with sufficient pressurized fluid to extend assembly 10 very quickly in a matter of seconds and without waiting for pump 51 to supply any portion of the required hydraulic fluid. The fluid system including the lines 60 and 65 for delivering or withdrawing fluid from the cylinders 40 constitutes a strut operating means to actuate the strut shortening and elongating means whereby the main frame may be moved between its extended and retracted positions.

As the main frame 15 nears an extended position, the wheels 16 engage the ground or supporting surface, and as the main frame continues to extend the bellows 19 are collapsed. At this time becuase of the demand on the air pressure source and in connection with the supplying of hydraulic fluid to the hydraulic cylinder 40, the air pressure in the air reservoir 47 and transverse lines connected thereto, is at a minimum and valve 30a is closed. When the time delay means in the valve 26 have performed their delaying function, and when the pressure in the air reservoir 47 has built up enough to open the valve 30a air is then supplied to the line 30 and to the valves 26 and air under pressure is supplied to the bellows 19 and the bellows start to inflate. As the bellows are inflating, the pressure in the upper ends of the cylinders 40 increases causing check valve 66a to immediately seat.

This locks the hydraulic fluid in the hydraulic cylinders and because the wheels 16 are now assuming a part of the weight of the truck and its load, the pressure in the hydraulic cylinders raises to about 1100 psi, depending, of course, upon what share of the load is to be taken by the wheels 16 and collapsible frame parts generally designated by the numeral 10.

The locking of the hydraulic fluid in the cylinders causes the two cylinders 40 to provide a rigid strut between the main frame of assembly 10 and truck chassis 11 as the expansion of the air bellows acts to assume a very substantial portion of the load otherwise carried by the rear axles of the truck while usually simultaneously increasing or decreasing the loading on the front axle to a relatively minor degree.

Upon completion of this load redistribution operation, valve 26 reaches its neutral position cutting off the further supply of air to the bellows. Thereupon the operator restores operating lever 80 of valve 75 to its full line position thereby closing valve 86 and opening vent valve 83 so that air escapes from the left hand end of cylinder 70 via the open relay valve 84, open valve 83 and venting port 85. Four-way valve 62 quickly returns to its central neutral position closing off both of the conduits 60 and 65 and as a result thereof there is an additional locking of cylinders 40 in their extended position. Accumulator 59 is precharged with gas to a suitable pressure such as 1500 psi. In consequence its bladder is fully extended and in readiness to absorb shock loads imposed on assembly 10. The truck is also in readiness to operate over the highway as air motor 50 continues to operate pump 51 to recharge accumulators 58 from their precharge condition of 200 psi up to a value of about 600 psi at which pressure motor 50 stalls. This operation may take 10–15 minutes whereas either the extension or the retraction operating cycle is completed in less than one-half a minute.

During travel over the highway, accumulators 58 continue to be recharged with fluid whereas accumulator 59 is isolated from accumulators 58 and is in standby condition ready to absorb and cushion excess loading imposed on booster 10. This may be occasioned by various causes including passing over bumps, around sharp curves or any of various other reasons when operating at the high speeds customary in present day traffic. If such loading does occur, fluid from cylinders 40 is readily accommodated in accumulator 59 to relieve temporary high stress conditions without need for venting fluid from the cylinders to reservoir 52 by conventional unloading valves commonly used heretofore. Such return of fluid to the reservoir relieves the excess loading but is highly undesirable because it leaves the cylinders inadequately charged with fluid and unable to continue a proper and adequate load sharing function. However, owing to the presence of the invention accumulator 59 in the system, excess loading on booster assembly 10 is minimized and cushioned without need for bleeding any fluid from cylinders 40.

When the operator leaves the highway or before unloading the truck, it is desirable to retract assembly 10. This is done by shifting the truck transmission lever 76 into its reverse position, thereby closing switch 90 and energizing solenoid valve 91. Pressurized fluid is now supplied to the control chamber of relay valve 84, closing the latter and also supplying pressurized fluid to the right end of cylinder 70 to move valve 62 to the left. Pressurized fluid is then supplied by valve 62 through line 65 and the left hand end of cylinders 40 and the left hand end of valve 62 thereby causing piston 66b to open check valve 66a and keep the same open while fluid from the right hand end of cylinders 40 returns to reservoir 52 via conduit 60, valve 66, valve 62 and conduit 65. This operation quickly retracts assembly 10 in less than 30 seconds to the compact folded condition illustrated in FIG. 3 wherein carriage wheels 16 are held tucked against the lower rear end of the chassis.

Should the operator inadvertently first shift control lever 80 of valve 75 to its open position, he would at once discover that this was ineffective to retract assembly 10. He might accidentally leave lever 80 in its open position, but as soon as he shifts lever 76 to open valve 91, the admission of air into the control at the top of relay valve 84 immediately closes this valve and cuts off the flow of pressurized air and at the same time vents air in the left hand end of chamber 70 to the atmosphere via vent port 84a.

If the operator attempts to back the truck at any time while assembly 10 is extended and preloaded, he will immediately initiate retraction of the assembly upon placing the transmission control lever 76 in its truck reversing position. Accordingly, and whether or not the driver is aware of it, carriage wheels 16 immediately begin to retract as valves 26 operate to vent air from bellows 19 to the atmosphere via venting port 32 of valve 26.

While the particular retractable load booster assembly for large cargo trucks herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. In combination, a vehicle having a vehicle structure and supporting wheels therefor, and a retractable load sharing structure connected to the rear end of said vehicle for use in redistributing the load of the vehicle to share the load with the regular supporting wheels therefor, said load sharing structure comprising:

a. a foldable main frame comprising an inner frame part and an outer frame part hinged together, the inner frame part being pivoted to the rear part of said vehicle structure so that it may swing in a vertical plane, said main frame being foldable upwardly to a position adjacent to the rear part of said vehicle and unfoldable to extend rearwardly from said vehicle in a generally horizontal direction;

b. strut means having one end connected to said vehicle structure at a position above the pivot of said inner frame part and connected at its other end to said outer frame part, said strut means including shortening and lengthening means whereby said strut can be shortened to fold said main frame adjacent the rearward part of said vehicle and elongated to extend said main frame in its generally horizontal position;

c. wheel means positioned near the outer end of said outer frame part and in a position below said outer frame part when said foldable main frame is in its extended position;

d. inflatable air bellows means positioned between said wheel means and said outer frame part;

e. strut operating means operable to actuate said strut shortening and elongating means whereby said main frame may be moved into its extended position without at that time placing any portion of the load of said vehicle on said load sharing structure; and f. means, operable after said foldable main frame and said strut means have been moved into their extended positions, for inflating said bellows means to cause said foldable main frame to move upwardly as a whole relative to said wheel means whereby said load sharing structure may be caused to support at least a part of the load of said vehicle.

2. A combination as defined in claim 1 in which there is means operable to initiate deflation of said air bellows means after said foldable main frame starts to move toward its folded position.

3. A combination as defined in claim 1 in which the means for shortening and elongating said strut comprises a hydraulic cylinder and in which there is means to lock hydraulic fluid in said hydraulic cylinder so that said strut will hold said main frame against upward movement relative to said vehicle when air is supplied to said bellows means.

4. A combination as defined in claim 1 in which there is a spring-frame connected to said outer frame part, an axle mounted on said spring frame, and said wheel means being mounted on said spring means and said bellows being positioned between said outer part of said main frame and said spring frame.

5. A combination as defined in claim 1 in which said main frame is provided in the form of a pair of main frame sections separated from each other and in which there is a pair of struts, one for each of said main frame sections, and in which said wheel means is supported by an axle extending between the outer frame parts of said main frame sections.

* * * * *